United States Patent
Einhorn

(10) Patent No.: US 11,076,612 B2
(45) Date of Patent: Aug. 3, 2021

(54) FROZEN PRODUCT AND METHOD OF PROVIDING SAME

(71) Applicant: Mordechai Einhorn, Toronto (CA)

(72) Inventor: Mordechai Einhorn, Toronto (CA)

( * ) Notice: Subject to any disclaimer, the term of this patent is extended or adjusted under 35 U.S.C. 154(b) by 56 days.

(21) Appl. No.: 15/835,942

(22) Filed: Dec. 8, 2017

(65) Prior Publication Data

US 2018/0160701 A1    Jun. 14, 2018

Related U.S. Application Data

(60) Provisional application No. 62/432,052, filed on Dec. 9, 2016.

(51) Int. Cl.
| | |
|---|---|
| A23G 9/04 | (2006.01) |
| A23L 2/02 | (2006.01) |
| A23G 9/22 | (2006.01) |
| A23L 2/42 | (2006.01) |
| A23B 7/05 | (2006.01) |
| A23B 7/04 | (2006.01) |

(52) U.S. Cl.
CPC ............ *A23G 9/045* (2013.01); *A23B 7/0433* (2013.01); *A23B 7/05* (2013.01); *A23G 9/222* (2013.01); *A23L 2/02* (2013.01); *A23L 2/42* (2013.01)

(58) Field of Classification Search
CPC ...... A23G 9/045; A23G 9/222; A23B 7/0433; A23B 7/05; A23L 2/02; A23L 2/42
USPC ......................................... 426/100, 565, 590
See application file for complete search history.

(56) References Cited

U.S. PATENT DOCUMENTS

| | | | |
|---|---|---|---|
| 2,117,215 A | 7/1936 | Ruch | |
| 3,024,117 A | 11/1958 | Barlow | |
| 3,293,046 A * | 12/1966 | Hendrikus | ............ A23L 3/0155 |
| | | | 426/393 |
| 3,914,440 A | 10/1975 | Witzig | |
| 5,157,939 A | 10/1992 | Lyon et al. | |
| 5,260,086 A * | 11/1993 | Downton | .................. A23L 2/06 |
| | | | 426/590 |
| 5,536,525 A | 7/1996 | Mogilevsky et al. | |
| 7,788,943 B2 | 9/2010 | Mogilevsky | |
| 2007/0261428 A1* | 11/2007 | Mogilevsky | ............ F28F 3/025 |
| | | | 62/353 |
| 2011/0003034 A1* | 1/2011 | Netzer | ................... A23G 9/045 |
| | | | 426/61 |
| 2015/0132463 A1* | 5/2015 | Ashokan | ................ A23G 9/045 |
| | | | 426/548 |

FOREIGN PATENT DOCUMENTS

CA    2711035    7/2009

OTHER PUBLICATIONS

International Search Report and Written Opinion, PCT/CA2017/051488, dated Mar. 26, 2018.
European Extended Search Report dated Aug. 19, 2020 in respect of European Application No. 17879520.9.

* cited by examiner

*Primary Examiner* — Jyoti Chawla

(74) *Attorney, Agent, or Firm* — Bereskin & Parr LLP/S.E.N.C.R.L., s.r.l.

(57) ABSTRACT

There is provided a frozen food product, such as frozen juice, and the method of providing same. This involves cooling the food product, such as a juice, to a slurry temperature within a freezing temperature range for the juice to provide a slurry, the juice slurry comprising a liquid juice component and a frozen juice component; providing the juice slurry to a container; and freezing the juice slurry within the container.

18 Claims, 6 Drawing Sheets

FROZEN PRODUCT AND METHOD OF PROVIDING SAME

CROSS-REFERENCE TO RELATED APPLICATION

This application claims the benefit of U.S. Provisional Patent Application No. 62/432,052 filed Dec. 9, 2016, the contents of which are incorporated herein by reference.

FIELD OF THE INVENTION

The present invention relates to a method for providing a frozen food product and the frozen food product thus provided, and more particularly relates to a method for providing a frozen juice product and the frozen juice product thus provided.

BACKGROUND OF THE INVENTION

Freezing can be used to preserve liquid and pumpable foods, such as juice, purées and some soups, during processing and storage. The frozen food, especially, for example, some kinds of juice, can retain some of its delicate flavor and characteristic color. Freezing can also facilitate transportation and storage.

One example of conventional freezing methods, as described in U.S. Pat. No. 3,024,117, comprises steps of storing fruit juice in a drum at a temperature above 32° F., transporting the drum to a cold storage facility, and allowing the drum's contents to freeze.

SUMMARY OF THE INVENTION

In accordance with an aspect of an embodiment of the present invention, there is provided a method of providing a frozen food product. The method comprises providing a pumpable food product; cooling the pumpable food product to a slurry temperature within a freezing temperature range for the pumpable food product to provide a food product slurry, the food product slurry comprising a liquid food product component and a frozen food product component; providing the food product slurry to a container; and freezing the pumpable food product slurry within the container.

In some example methods, the pumpable food product can be a liquid. In some embodiments the pumpable food product can be a juice, such as a vegetable juice or fruit juice, or, alternatively, could be a soup or sauce.

In some example methods, the step of freezing the food product slurry within the container comprises freezing the food product slurry such that substantially all of the food product slurry is frozen within a time interval of 4 days. In some of these example methods, the step of freezing the food product slurry within the container comprises freezing the food product slurry such that substantially all of the food product slurry is frozen within a time interval of 2 days.

In some example methods, the frozen component comprises at least 2-70% of the food product slurry when the food product slurry is provided to the container.

In some example methods, the frozen component comprise at least 50-70% of the food product slurry when the food product slurry is provided to the container.

In some example methods, freezing the food product slurry within the container comprises storing the food product slurry within the container in a freezer environment having a freezing temperature no colder than a temperature difference of 40° F. below the slurry temperature.

In some example methods, the freezing temperature is no colder than a temperature difference of 34° F. below the slurry temperature.

In accordance with some aspects of some embodiments of the present invention, there is provided a frozen food product made by any of the above-described example methods of aspects of embodiments of the present invention.

In accordance with an aspect of an embodiment of the present invention there is provided a frozen food product comprising a container; and a mixture of a plurality of food product constituents within the container. The mixture i) is frozen within the container; ii) is pumpable when thawed; iii) comprises a freeze suppressant constituent in the plurality of food product constituents, the freeze suppressant constituent lowering a freezing temperature of the mixture; iv) defines a freeze suppressant constituent concentration of the freeze suppressant constituent in the mixture; and, iv) defines a variance in the freeze suppressant constituent concentration throughout the mixture, the variance in the freeze suppressant constituent concentration throughout the mixture within the container being less than 20%.

In some embodiments, the variance in freeze suppressant constituent concentration throughout the mixture in the container can be less than 10%.

In some embodiments, the freeze suppressant constituent is sugar, and the freeze suppressant constituent concentration is Brix.

In some embodiments, the container has a volume of more than 20 gallons, and the mixture occupies a combined volume of at least 20 gallons within the container.

In some embodiments, the container has a volume of more than 40 gallons, and the combined volume of the mixture is at least 40 gallons within the container.

In some embodiments, the food product can be juice, such as, for example without limitation, fruit or vegetable juice.

In some embodiments, the frozen food product is liquid when thawed.

In some embodiments, the freeze suppressant constituent is salt, and the freeze suppressant constituent concentration is salt concentration.

BRIEF DESCRIPTION OF THE DRAWINGS

These and other advantages of the instant invention will be more fully and completely understood in conjunction with the following detailed description of the preferred aspect of the present invention with reference to the following drawings, in which FIG. 1, in a flowchart, illustrates a method of providing a frozen juice product in accordance with a preferred aspect of an embodiment of the present invention.

DETAILED DESCRIPTION OF PREFERRED ASPECTS OF THE INVENTION

Various methods or products are described below in relation to frozen food products and the preparation of same. No embodiment described below limits any claimed invention and any claimed invention may cover processes or products that differ from those described below. The claimed inventions are not limited to products or processes having all of the features of any one product or process described below or to features common to multiple or all of the products described below. It is possible that a product or process described below is not an embodiment of any claimed invention.

Frozen food products are well-known. Some frozen food products, before fully freezing or after at least partial thawing, can be liquid or pumpable. A food product is pumpable if it can be drawn through a conduit, by, for example, suction provided via a conventional pump used in the food processing industry. While the below description focuses on aspects of embodiments of the present invention involving juice, it will be appreciated that the invention is equally applicable to other food products, such as for example without limitation, purées, sauces and some soups.

Figure 1:
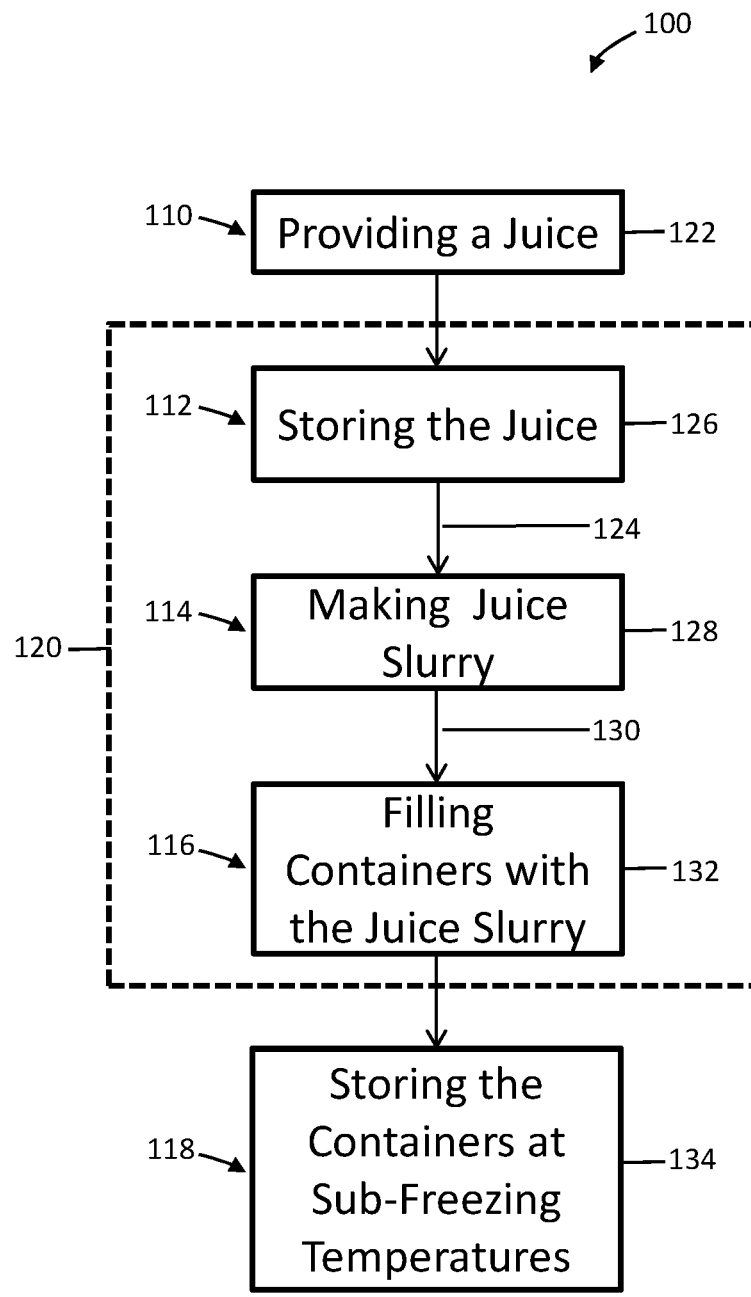

Referring to FIG. 1, there is illustrated in a flowchart a method 100 of providing a frozen juice product in accordance with an aspect of an embodiment of the present invention. The method 100 can begin with step 110, in which a juice 122 is provided to a juice processing facility 120. The juice 122 may be made from fruits or vegetables. For example, the juice 122 may be made from orange, grapefruit, mandarin orange, tangerine, lemon, lime, (in general, different kinds of citrus fruits), strawberries, raspberries, blueberries, blackberries, pineapples, apples, banana, apricot, peach, plum, tomato, carrot or any combination of these fruits and vegetables or other fruits and vegetables.

At step 112, the juice 122 can be stored in cold juice storage 126 until called for further processing in the juice processing facility 120. The cold juice storage 126 may be equipped with a refrigeration system or it may be placed in a refrigerator (not shown). A temperature of the juice 122 within the cold juice storage 126 may be between 32-40° F. For example, the juice 122 can be stored in cold juice storage 126 having a 1600 gallon capacity at 35° F.

At step 114, the juice 122 stored in the cold juice storage 126 can be dispatched for further processing. The juice 122, while still in liquid form, can be transported by a liquid transport 124 to a juice slurry machine 128 to be transformed into juice slurry 130. For example, a suitable liquid transport 124 could include, without limitation, one or more corrosion resistant conduits connecting an output of the cold juice storage 126 with an input of the juice slurry machine 128. Examples of suitable conduits could include anodized aluminum pipes, PVC pipes, ABS pipes, stainless steel pipes, or any other corrosion resistant conduits known in the art. Alternatively, the juice 122 from the cold juice storage 126 may be poured into a hopper in communication with the juice slurry machine 128.

A slurry solution may contain water and freeze point suppressant additives together with suspended ice crystals. For example, the juice 122 may contain sugar. The resulting juice slurry 130 may be a mixture of the liquid juice 122, containing water, sugar, and other constituents such as pulps, fibers, etc., and millions of suspended micro-crystals of ice. Other juices or pumpable food products more generally, may, for example without limitation, include more salt or lipids, than sugar.

A slurry solution can be at least partly defined by its ice fraction and its temperature. The temperature of a slurry solution may partly depend on the percentage and types of additive used to suppress the freezing point of the solution: adding freeze suppressants enables the temperature of the slurry solution to be further reduced by reducing the temperature at which the slurry solution transitions from liquid to solid. The ice fraction within the slurry solution can also depend on the amount of time during which the solution is circulated in the slurry making machine and a flow rate at which the liquid juice mixture enters the slurry making machine.

Different slurry making machines known in the art may be used to convert the liquid juice 122 to the juice slurry 130. For example, Ice Generator IG-48-10-120 available from IceGen Inc. at 174-176 Torbay Road, Markham, Ontario, L3R 1G6, Canada, may be used as juice slurry machine 128. Other slurry making machines, such as the machine described, for example, in U.S. Pat. No. 5,157,939 (Lyon et al.) or U.S. Pat. No. 7,788,943 (Mogilevsky) could also be used.

Figure 2:
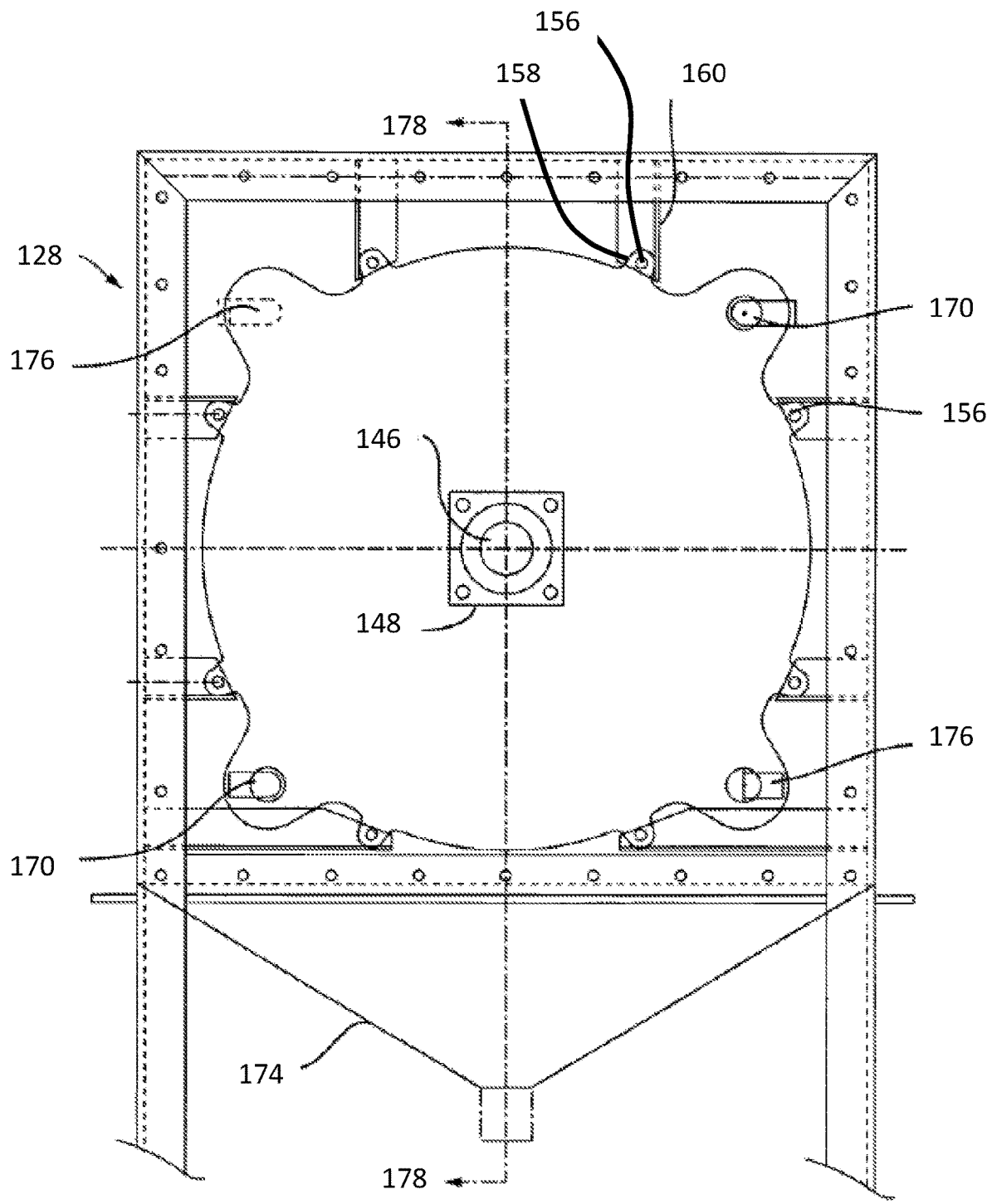
FIG. 2, in a schematic diagram, illustrates a front view of a juice slurry machine for making juice slurry from a liquid juice.
Figure 3:
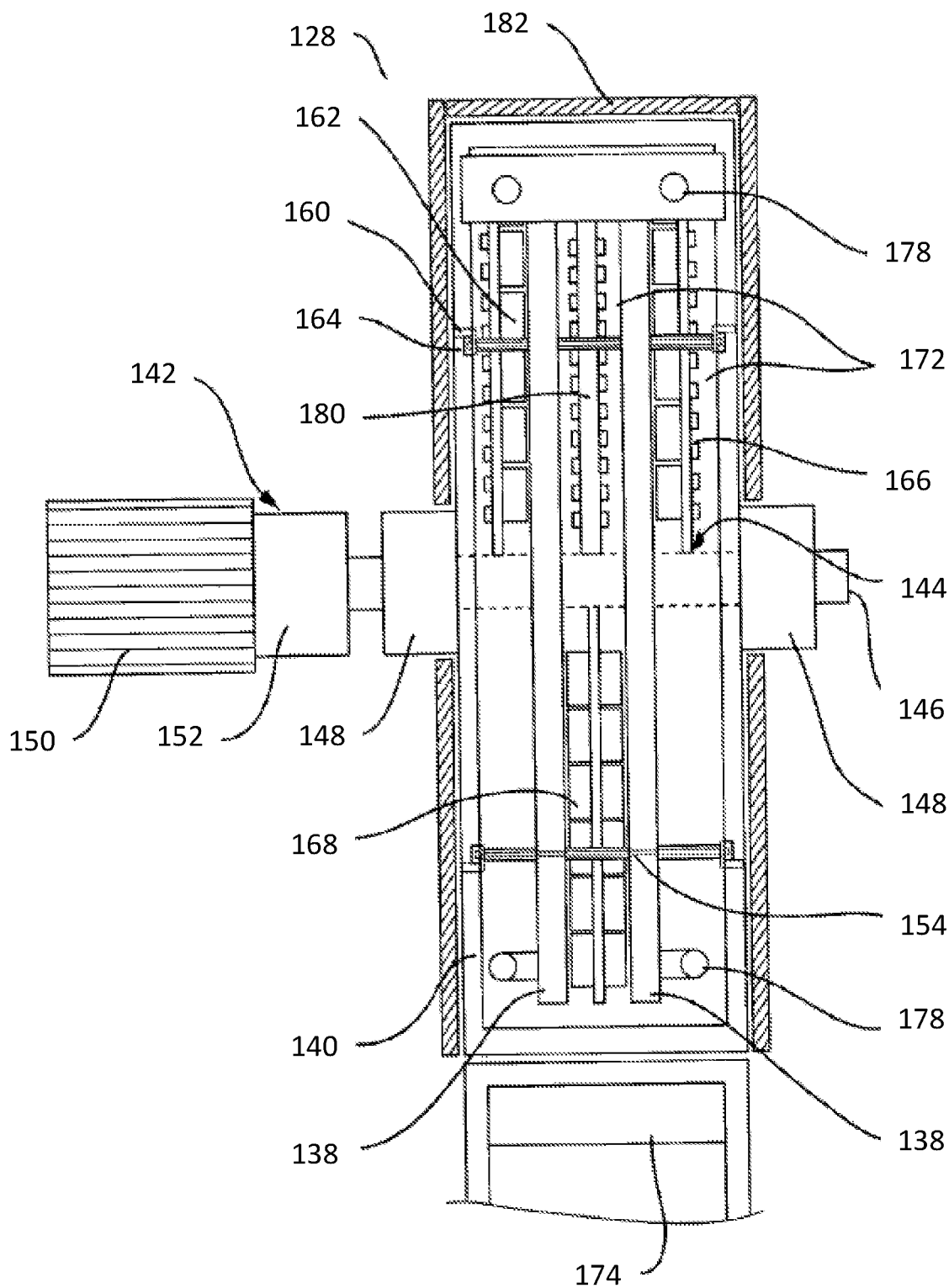
FIG. 3, in a schematic diagram, illustrates a cross sectional view of the juice slurry machine of FIG. 2 taken along line 178-178.

Referring to FIGS. 2 and 3, there is illustrated, in schematic diagrams, a variant of juice slurry machine 128. The juice slurry machine 128 may comprise a plurality of flat heat exchangers 138 within a support frame 140, a scraping system 142, a liquid supply system 144, and a plurality of insulation panels 182 bolted to the frame 140, creating a thermally insulated compartment. Passing through the heat exchangers 138, which may be aligned vertically in a generally parallel position, can be a central shaft 146, which may be supported on the outside of the frame 140, by a pair of bearings 148. The shaft 146 can be driven by a motor 150 through a gearbox 152. A plurality of threaded rods 154 can pass through aperture 156 in apertured tabs 158, which may be mounted to supporting brackets 160. The rods 154, brackets 160 and spacers 162 may hold the heat exchangers 138 in a vertical position and can be locked in place by nuts 164. Between the outermost heat exchanger and the frame 140 can be positioned an outer scraping device 166 while an inner scraping device 168 can be positioned between two heat exchangers 138.

A refrigerant may enter the juice slurry machine 128 through a plurality of inlets 170, exit the juice slurry machine 128 through a plurality of outlets 176, and back out through connections 178. The liquid supply system 144 can supply the juice 122 to spray tube 180 to be sprayed over the surface of the heat exchangers 138 from nozzles 172. The scraping devices 166 and 168 can then be rotated by the shaft 146 to remove the ice-juice mixture from the surface of the heat exchangers 138. The removed ice-juice mixture can then fall down into hood 174. Once in the hood 174, the ice-juice mixture can then be pumped into a reservoir (not shown), where the ice can be separated, and the liquid juice 122 may be pumped back into the juice slurry machine 128 until the mixture in the reservoir achieves a desired ice fraction and temperature. The mixture within the reservoir, when the desired ice fraction and temperature are achieved, can be called the juice slurry 130.

The juice slurry 130 made by the juice slurry machine 128 may have an ice fraction of 2-70 percent, 5-50 percent or 50-70 percent. It is important that the ice fraction be sufficiently above 0% to maintain the temperature of the juice slurry 130 around the freezing point. It is also important that the ice fraction be kept sufficiently low, sufficiently below 100%, to allow the juice slurry 130 to flow, and to prevent unintended freezing within the flow conduits. The desired ice fraction may vary from context to context, and from food product to food product. As discussed, the ice fraction may partly depend on the circulation time of the juice 122 within the juice slurry machine 128. Other conditions, such as factors affecting the viscosity of the juice slurry 130 or factors affecting the flow rate of the juice slurry 130, may also affect the desired ice fraction. The flow rate itself may partly depend on the capacity of the liquid supply system, such as a pump, responsible for supplying the juice slurry machine 128 with juice 122 and the nature of the conduits used for transport. For example, the juice 122 may flow into the juice slurry machine 128 at 2-50 gallons per minute depending on the equipment used. The temperature of the juice slurry 130, depending on the percentage and types of freeze point suppressant used, may be between 20° F. to 30° F. For example, a steady operation of juice slurry machine 128 at 3 gallons per minute for 50 minutes may result in the juice slurry 130 having an ice fraction of 36.7% and a temperature of 29° F.

Referring again to FIG. 1, the final step at the juice processing facility 120 can be step 116. At this step, a plurality of containers 132 can be filled with the juice slurry 130 made in step 114. Containers 132 may have any shape or capacity suitable for storing slurry as might be known in the arts. For example, containers 132 may be cylindrical drums. In some instances, each drum may have a storage volume of approximately 50 gallons, or, for smaller drums, approximately 20 gallons.

In some instances, each drum may hold, for example, 420 pounds of the juice slurry 130. Containers 132 may not be filled completely so that a free space remains on top of each container 132 allowing for freeze expansion of the content of each container 132 during step 118, discussed below. Any filling methods known in the art may be used. For example, the juice slurry 130 may be pumped into containers 132.

The last step of the method 100 shown in FIG. 1 is step 118 in which the plurality of containers 132 filled in step 116 with the juice slurry 130 can be stored in sub-freezing temperatures to provide a frozen juice product. Each container 132 may be stored in a sub-freezing storage facility 134. The sub-freezing storage facility 134 may utilize a conventional freezer, blast freezer, or any other means known in the art for creating sub-freezing temperatures. The difference between the juice slurry temperature and the sub-freezing storage facility temperature can be less than 40° F. In another embodiment, the temperature difference may be less than 34° F. The temperature of the sub-freezing storage facility 134 may be, for example, −5 to 5° F.

The sub-freezing storage facility 134 may either be adjacent to the juice processing facility 120 or be spaced from the juice processing facility 120. In the former case, a conveyor belt or a drive belt may be employed to transport each container 132 from the juice processing facility 120 to the sub-freezing storage facility 134. Alternatively, a local transportation means such as forklifts, or other similar transportation means known in the art, may be employed. In the latter case, each container 132 may be transported to the sub-freezing storage facility 134 by on-road, off-road, rail, water, air transportation, or any other similar method know in the art.

Containers 132 may stay in the sub-freezing storage facility 134 until the juice slurry 130 within each container freezes thoroughly. A frozen juice product according to an aspect of the present invention may comprise a container 132 and fully frozen juice slurry 130 within the container 132. Juice slurry 130, itself, may comprise, without limitation, water, juice, pulp, fiber, vitamins, minerals, freeze point suppressant additives, and microcrystals of ice.

Homogeneity of the frozen juice product may be defined, partly, based on variance in concentrations of various constituents of juice slurry 130 throughout the container 132 during the freezing process. The lower the variance in concentrations throughout the container 132, the more homogenous the frozen juice product may be. A concentration of juice slurry 130 can be measured in degree Brix. For some juices, and for many soups, it could also be measured in salt concentration.

A variance in Brix of the juice constituent of juice slurry 130 throughout the container 132 during the freezing process may be a measure of the frozen juice product's homogeneity. A concentration of the juice in a center of each container 132 filled with the juice slurry 130 during its stay at the sub-freezing storage facility 134 may remain 85-100% similar to the concentration of the juice constituent within the center of each container 132 at the time of filling in step 116.

Alternatively, variance in concentrations of all or some of the constituents of the juice slurry 130 throughout the container 132 may be a measure of the frozen juice product's homogeneity. During the freezing process, this variance in concentrations of all or some of the constituents of the juice slurry 130 can be in the range of 0-20% throughout the container 132.

The change in the concentration may partly depend on the ice fraction of the juice slurry 130 in step 116. The concentration of the juice in the center of each container 132 may not change significantly during the freezing process provided juice slurry 130 had a sufficiently large ice fraction at time of filling in step 116. Alternatively, there may be no variance in average concentration of all or some of the constituents of fully frozen juice slurry 130 throughout the container 132 if the juice slurry 130, at time of filling in step 116, had a sufficiently large ice fraction.

Juice slurry 130 may need to spend 2-4 days within sub-freezing storage facility 134 to freeze completely (over 99% frozen). Containers 132 filled with the juice slurry 130, as opposed to the liquid juice 122, may spend 40-80% less time in the sub-freezing storage facility 134 to freeze completely, depending, without limitation, on the ice fraction of the juice slurry 130. The higher the ice fraction of the juice slurry 130, the lower the time the juice slurry 130 within container 132 may need to spend within the sub-freezing storage facility 134. Accordingly, freezing containers 132 filled with the juice slurry 130, as opposed to the liquid juice 122, may reduce energy consumption by sub-freezing storage facility 134 by a factor of 2-4 times.

In conventional methods of providing a frozen juice product, the liquid juice 122 may be filled directly into containers 132 and be transported to the sub-freezing storage facility 134. In other words, conventional methods can be implemented without step 114. Converting the juice 122 to the juice slurry 130, according to step 114 of the method 100, can provide a frozen juice product faster and using less energy while maintaining taste, color, and homogeneity of the juice.

When the juice 122 is frozen in accordance with conventional methods, because of convection heat transfer between vertical and horizontal layers of the juice 122, which may have different physical characteristics due to different concentrations of water and juice, water may tend to move towards an outer periphery of the container 132 while juice may move towards a center of the container 132. In other words, the juice 122 may concentrate in the center of the container 132. This may result in a frozen juice having different color and taste profiles in different regions of the container 132. The frozen juice may have a lighter color and a watery taste around the periphery and a darker color and stronger taste around the center of the container 132. In other words, the frozen juice may lose homogeneity.

Moreover, providing a frozen juice according to conventional methods may consume more energy and time. The contents of the container 132 may lose temperature by conduction heat transfer between the outer periphery of the container 132 and chilled air of the sub-freezing storage facility 134. As water may move towards the outer periphery, water may be more rapidly cooled than juice. Further, the freezing temperature of water may be warmer than the freezing temperature of juice because the sugar within juice may act as a freeze point depressant. Accordingly, before any juice within the center of the container 132 freezes, a blanket of ice may form around the still-liquid juice within the center. This blanket of ice may hinder the exchange of heat between the liquid center and chilled air surrounding the container 132. Thus, the contents within the center may freeze significantly later than the contents around the periphery of the container 132. Thus, to freeze the whole contents of the container 132 filled with the liquid juice 122, as opposed to the juice slurry 130, more time and energy may be required. Moreover, this non-simultaneous freezing of different regions of the container 132 filled with the liquid juice 122, as opposed to the juice slurry 130, and overall prolonged freezing time of the whole contents may result in mold and bacteria growth in unfrozen portions, pulp degradation, and, in some cases, a completely spoiled frozen juice.

During an experiment, the juice 122 was stored in the cold juice storage 126 having a capacity of 1600 gallons and temperature of 35° F. located within the juice processing facility 120. The concentration of the juice 122 was 13° Brix.

The juice was then circulated at a rate of 3 gallons per minute through the juice slurry machine 128 for approximately 50 minutes to build up 42% ice fraction juice slurry 130 maintained within a freezing temperature range of 28-29° F. The juice slurry 130 was then filled into 21 cylindrical containers 132 ("juice slurry containers"). Five other containers 132 were filed with the liquid juice 122 at 35° F. ("juice control containers"). Juice slurry containers and juice control containers were stored at the sub-freezing storage facility 134 maintained within a freezer temperature range of 0° F.±5° F. for nine days.

Four temperature probes were installed at different locations within one juice slurry container and one juice control container. The temperature probes measured temperatures at four different regions within each container: a region in the middle of the container, height-wise, in vicinity of the outer periphery of the container; a region in the middle of the container, height-wise, between the center and the outer periphery; a region close to the top of the container located within the center; and a region close to the middle of the drum, height-wise, within the center.

Figure 4:
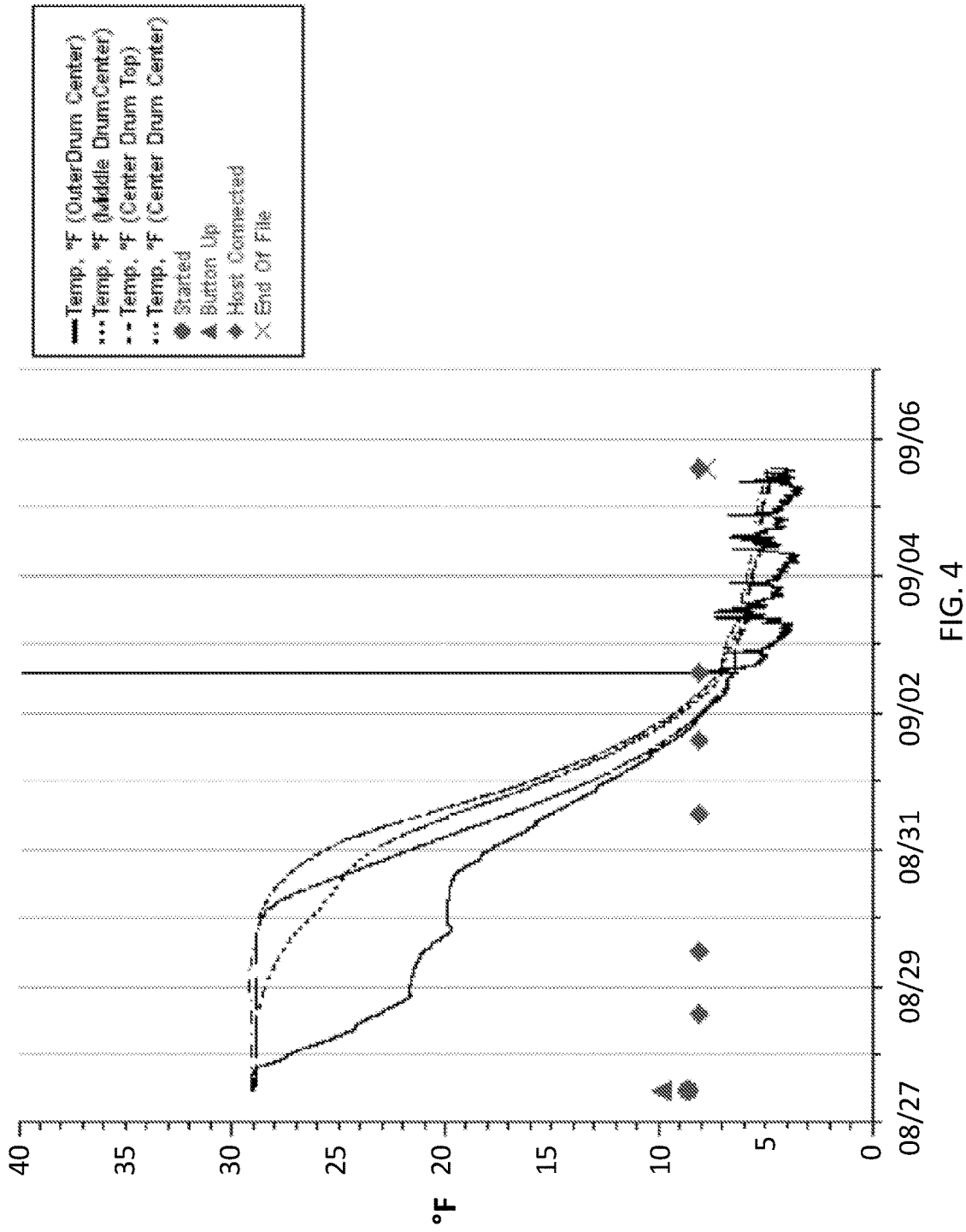
FIGS. 4-5, in graphs, illustrate changes in temperatures of a juice slurry container containing a juice slurry (FIG. 4) and a juice control container containing a liquid juice (FIG. 5), respectively, during an experiment conducted for comparing the freezing profile of the juice slurry with the freezing profile of the liquid juice when stored in a sub-freezing storage facility.
Figure 5:
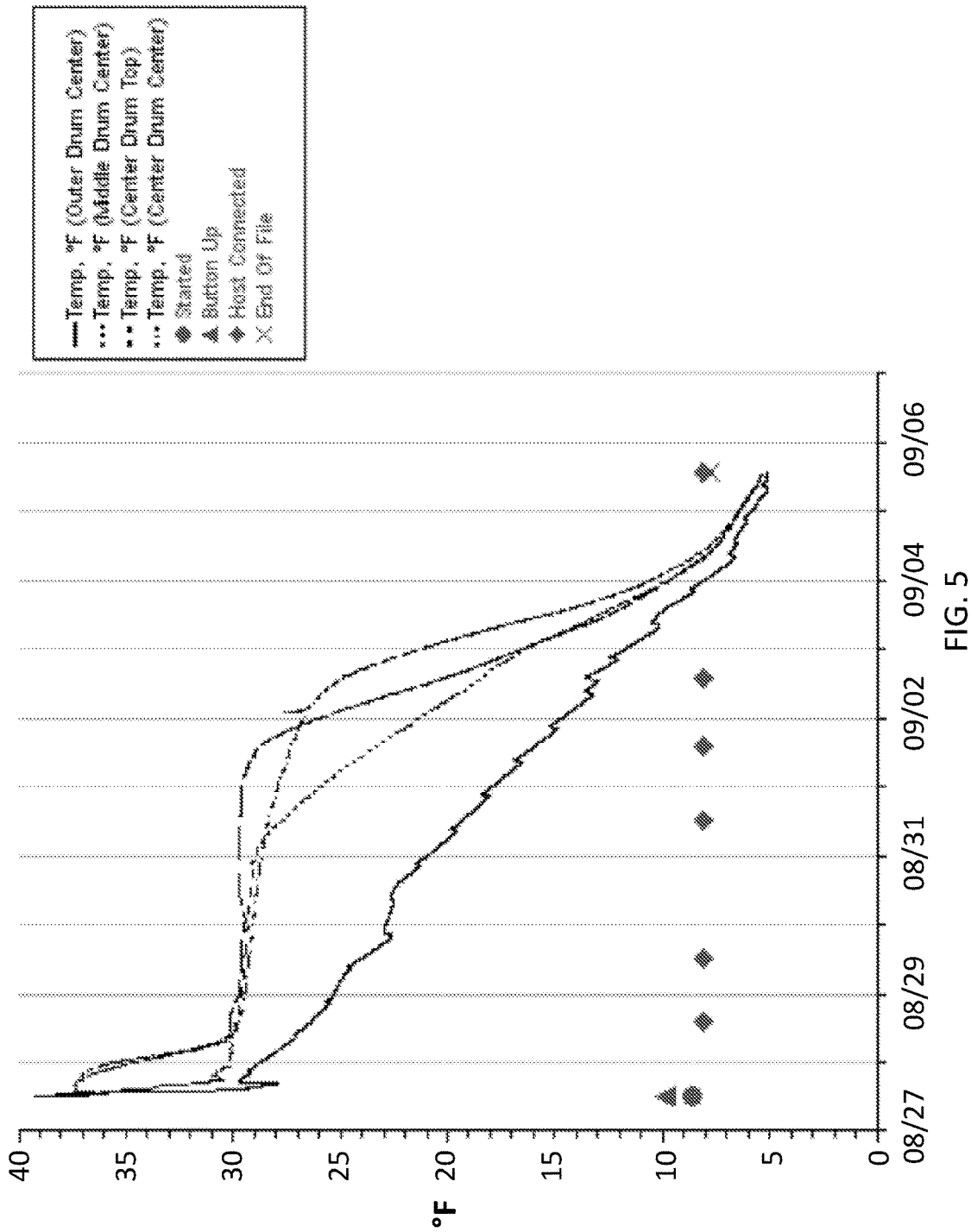

FIGS. 4 and 5 show Temperature vs. Time graphs for the juice slurry container and the juice control container, respectively, during nine days of the experiment. The temperature within the four regions, discussed above, are illustrated using various types of line and are dubbed "Outer Drum Center", "Middle Drum Center", "Center Drum Top", and "Center Drum Center", respectively.

Figure 6:
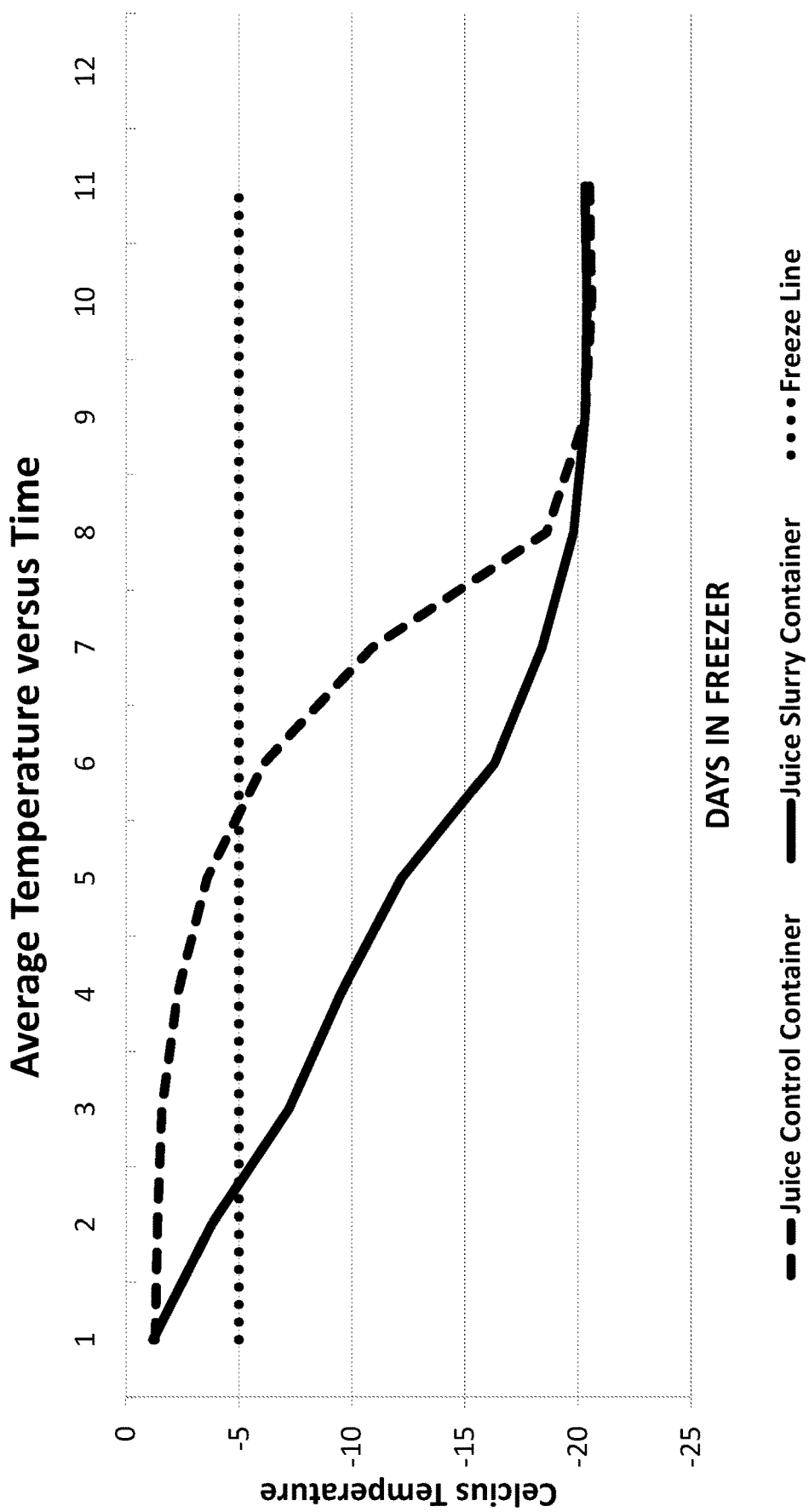
FIG. 6, in a graph, illustrates a comparison between changes in an average temperature within the juice slurry container and changes in an average temperature within the juice control container during the experiment.

As discussed in more detail below, FIG. 4, shows that the temperature within the outer periphery of the juice slurry container dropped by approximately 10° F. in one day and temperatures within the other three regions dropped by approximately 10° F. in four days. From day 3 onwards, the temperature within all four regions decreased uniformly with almost the same slope. In day 6, the temperatures within all four regions were approximately the same as the sub-freezing storage facility 134's temperature. In contrast, as discussed in more detail below, FIG. 5 shows that the drop in the temperatures of the regions other than the outer periphery within the juice control container started almost two days after the drop in the temperatures of the regions other than the outer periphery within the juice slurry container. Moreover, it almost took 9 days for the temperatures within all four regions to drop to the temperature of the sub-freezing storage facility 134. FIG. 6 illustrates changes in average temperature within each container during the freezing process. As illustrated, it took 2 days for the juice slurry container to freeze completely while it took almost 6 days for the juice control container to freeze completely. In some embodiments, the freezer temperature maintained can be no colder than a temperature difference of 34° F. below the slurry temperature. In other embodiments, the freezer temperature maintained can be no colder than a temperature difference of 40° F. below the slurry temperature.

In day 1, the juice slurry container was visibly frozen throughout, although not completely solid. The juice slurry container was rocked but the juice did not move within the container. On the other hand, a large mass of the juice was in liquid form in a large center core of the juice control container. A 3-inch ring of ice was formed around an outer diameter of the juice control container. The temperature within the juice slurry container was 1° F. below the juice control container.

In day 2, the juice slurry container was visibly frozen and solid with the exception of a 5-6" center core, which was soft ice. No liquid was noticeable within the juice slurry container. The color appeared to be uniform throughout the container. It was not possible to penetrate to lower regions of the container. Juice control container was liquid below a ½" cap of ice in a large center core. Similar to day 1, there was only a 3-inch ring of ice around the outer diameter of the juice control container. The color of the frozen ring was lighter, closer to color of an ice, than the color of the liquid within the center. The concentration of the liquid within the center was 13.04° Brix.

In day 3, the juice slurry container appeared to be frozen solid throughout. Penetration to the center of the container was not possible. On the other hand, the center of the juice control container was soft and liquid. The concentration of the liquid within the center was measured. It was 14.5° Brix.

In day 4, the juice slurry container was solid frozen throughout. The temperature at the center of the container was 20.3° F. The color appeared to be uniform throughout. No liquid was noticed. In contrast, the juice control container still had liquid below a 1" cap of ice in a large center core. The frozen ring was 4-6". The content of the frozen ring had a lighter color than the content of the center. The concentration of the liquid within the center was 17.5° Brix.

In day 5, the juice slurry container was solid frozen throughout. The temperature at the center of the container was 11.5° F. On the other hand, the juice control container still contained liquid below a 1-2" cap of ice within a 5-6" center core. The frozen content near the outer periphery of the container was lighter in color than the center. The concentration of the liquid at the center was 21.8° Brix.

In day 6, the temperature at the center of the juice slurry container was 6.6° F. The color of the content was more uniform and more orange than the content of the juice control container. No liquid was noticeable. On the other hand, even though the juice control container had the appearance of being frozen solid, it was actually liquid below a 4-5" cap of ice in a center core area. A sample of the liquid core was taken for concentration measurement. The concentration was 28.67° Brix.

In day 7, the juice slurry container was solid frozen. The juice control container was observed to be frozen around a 4-5" center core of slush located below 4-5" ice cap. The center was liquid free. A small sample of liquid was collected by vibrating a sample of slush from the center. The concentration of the liquid was 46.1° F.

In day 9, both the juice slurry container and juice control container were solid frozen throughout. The temperature within both containers was near the average room temperature of 5-6° F.

It was observed that the juice slurry container was in frozen solid form in day 3. The temperature of the juice slurry 130 within the juice slurry container never surpassed the juice slurry 130 filling temperature of 28-29° F. The temperatures throughout the juice slurry container were reduced uniformly from day 3 onwards. It may be an indication that the juice slurry container was solid frozen on day 3. No juice was noticeable in the container. Penetration to the center was not possible. The juice slurry 130 also appeared to have a very uniform bright color and consistency. No evidence of juice concentration in the center of the container was noticed during the freezing process.

It was observed that the juice control container started freezing at the exterior of the container to the center, and at the top of the container to the bottom. Even after 5 days, the juice control container had a liquid center core. The freezing process separated water from juice. The outer periphery of the container comprised a ring of ice while the center was frozen juice. The concentration of the juice in the center of the juice control container increased from 13° Brix at the initial filling to approximately 30° Brix in day 6 and 45° brix in day 7.

Accordingly, it was concluded that by filling the container 132 with the juice slurry 130, and not the liquid juice 122, before sending the container 132 to sub-freezing storage facility 134, less time and energy may be spent for providing a frozen juice product since the juice slurry 130 may freeze in less time than the liquid juice 122. Moreover, homogeneity and uniformity of the juice may be maintained during the freezing process as the tendency of juice to concentrate toward the centre of the container can be significantly reduced, or even substantially eliminated. Thereby, after thawing, the juice may have the same taste, color, and homogeneity, as it had while liquid.

While methods and frozen food products in accordance with aspects of embodiments of the present invention have been described in relation to juice, it will be appreciated that this method can also be applied to other liquid, semi-liquid or pumpable fruit products, such as, for example, purées, soups such as clear soups, consommés, and more generally soups having a uniform composition. These soups need not be entirely liquid, provided they are pumpable.

Further, it will be appreciated that while the homogeneity of the frozen juice product has been defined mainly in relation to variance in Brix, this homogeneity can also be defined in relation to variance in concentration of other constituents of the food product, especially other freeze suppressants constituents. For example, in some liquid or pumpable food products, salt concentration can be relatively high, and these higher concentrations of salt can also lower the temperature at which the food product freezes. Supplying the liquid or pumpable food product to the container in slurry form before freezing the food product can reduce the tendency of salt, or other freeze suppressant, to migrate toward the center of the container, as the contents of the outer portion of the container may freeze first, thereby enhancing homogeneity of the food product. As with Brix, variance in salt concentration throughout a food product within the container may be kept to under 20%, and preferably to under 10%, by initially supplying the food product to the container as a slurry comprising both ice and liquid components, and subsequently, freezing this food product slurry within the container.

Numerous specific details are set forth herein in order to provide a thorough understanding of the exemplary embodiments described herein. However, it will be understood by those of ordinary skill in the art that there embodiments may be practices without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. A method of providing a frozen fruit and/or vegetable product, the frozen fruit and/or vegetable product being a frozen juice, puree, sauce, and/or soup, the method comprising
   a) providing a pumpable fruit and/or vegetable product;
   b) cooling the pumpable fruit and/or vegetable product to a slurry temperature to provide a fruit and/or vegetable product slurry, the fruit and/or vegetable product slurry comprising a liquid fruit and/or vegetable product component and a frozen fruit and/or vegetable product component;
   c) after cooling the pumpable fruit and/or vegetable product to the slurry temperature to provide the fruit and/or vegetable product slurry, providing the fruit and/or vegetable product slurry to a container; and then,
   d) freezing the fruit and/or vegetable product slurry within the container,
   wherein the method is performed without aerating any one of the pumpable fruit and/or vegetable product and the fruit and/or vegetable product slurry during an overrun step.

2. The method as defined in claim 1 wherein the step of freezing the fruit and/or vegetable product slurry within the container comprises freezing the fruit and/or vegetable product slurry such that substantially all of the fruit and/or vegetable product slurry is frozen within a time interval of 4 days.

3. The method as defined in claim 2 wherein the step of freezing the fruit and/or vegetable product slurry within the container comprises freezing the fruit and/or vegetable product slurry such that substantially all of the fruit and/or vegetable product slurry is frozen within a time interval of 2 days.

4. The method as defined in claim 1 wherein the frozen fruit and/or vegetable product component comprises at least 2-70% of the fruit and/or vegetable product slurry when the fruit and/or vegetable product slurry is provided to the container.

5. The method as defined in claim 1 wherein the frozen fruit and/or vegetable product component comprises at least 50-70% of the fruit and/or vegetable product slurry when the fruit and/or vegetable product slurry is provided to the container.

6. The method as defined in claim 1 wherein freezing the fruit and/or vegetable product slurry within the container comprises storing the fruit and/or vegetable product slurry within the container in a freezer environment having a freezing temperature no colder than 40° F. below the slurry temperature.

7. The method as defined in claim 6 wherein the freezing temperature is no colder than 34° F. below the slurry temperature.

8. The method as defined in claim 1 wherein the fruit and/or vegetable product slurry consists of water, ice, and juice made from at least one of a fruit or a vegetable.

9. The method as defined in claim 8 wherein the juice comprises vitamins and minerals.

10. The method as defined in claim 8 wherein the juice comprises at least one of pulp and fiber.

11. The method as defined in claim 1 wherein the fruit and/or vegetable product slurry consists of water, ice, juice made from at least one of a fruit or a vegetable, and at least one of an added vitamin, mineral, and freeze point suppressant.

12. The method as defined in claim 1 wherein the frozen fruit and/or vegetable product component comprises microcrystals of ice suspended in the liquid fruit and/or vegetable product component.

13. The method as defined in claim 12 wherein the frozen fruit and/or vegetable product component comprises millions of microcrystals of ice.

14. The method as defined in claim 13 wherein cooling the pumpable fruit and/or vegetable product to the slurry temperature to provide the fruit and/or vegetable product slurry comprises spraying the pumpable fruit and/or vegetable product over a freezing surface of a heat exchanger and then scraping the frozen fruit and/or vegetable product component off of the freezing surface of the heat exchanger.

15. The method as defined in claim 1 wherein concentrations of a plurality of constituents of the pumpable fruit and/or vegetable product is maintained, and a homogeneity of the plurality of constituents is maintained, when cooling the pumpable fruit and/or vegetable product to the slurry temperature to provide the fruit and/or vegetable product slurry; and, the plurality of constituents comprises at least one freeze point suppressant.

16. The method as defined in claim 15 wherein the concentrations of the plurality of constituents of the fruit and/or vegetable product slurry are maintained, and the homogeneity of the plurality of constituents are maintained, when freezing the fruit and/or vegetable product slurry within the container, such that the concentrations of the plurality of constituents of the pumpable fruit and/or vegetable product is maintained during steps (a), (b), (c), and (d).

17. The method as defined in claim 16 wherein a homogeneity of the frozen fruit and/or vegetable product is 85-100% similar to a homogeneity of the fruit and/or vegetable product slurry.

18. The method as defined in claim 17 wherein the homogeneity of the frozen fruit and/or vegetable product and the homogeneity of the fruit and/or vegetable product slurry is based on a variance in Brix.

* * * * *